COMPUTER GATING CIRCUIT

Filed Jan. 16, 1962

2 Sheets-Sheet 1

MARTIN H. GRAHAM
INVENTOR.

BY
F. D. Copeland Jr.
Attorney

MARTIN H. GRAHAM
INVENTOR.
BY
F. D. Copeland Jr.
Attorney 3,235,847
Patented Feb. 15, 1966

3,235,847

COMPUTER GATING CIRCUIT

Martin Harold Graham, Houston, Tex., assignor to Texas Instruments Incorporated, Dallas, Tex., a corporation of Delaware Filed Jan. 16, 1962, Ser. No. 166,488
11 Claims. (Cl. 340—172.5)

This invention relates to a logical switching gate circuit and more particularly to such a circuit for transferring information from one computer register to another.

In computers, such as of the binary digital type, the word or number information is stored in a register. Such a register may consist of a plurality of storage devices, one for each information bit. One form of storage device for the information bits may comprise bistable multivibrators known in the art as flip-flops. As is well known, these multivibrator circuits each comprises a pair of electron discharge devices such as transistors or vacuum tubes so coupled to each other that when one is in a state of conduction the other is cut off. When a pulse of proper polarity and potential is applied to the control circuit of the electron discharge device which is conducting, or a pulse of the proper opposite polarity and potential is applied to the one in a state of non-conduction, the device which is conducting at the time of the application of the pulse is switched into a non-conducting state and the other into a conducting state. The binary digit "0" or "1" is represented by a discrete but different potential across each of the two outputs, which is reversed or interchanged if the opposite binary digit is to be represented.

In order to transfer the information from one such register to another, one practice of prior art devices employs a switching magnetic core matrix device. The cores are rings of ferrite of high magnetic retentivity and are characterized by a square hysteresis loop. Each of the cores is provided with two windings, one of the winding being coupled to one element of the first register and the other to a gating pulse source. Upon coincidence of pulses in the two windings of a polarity to change the state of magnetization of the core, a readout pulse is produced in an output lead threaded through the ring opening and coupled into an element of a second register. As can be seen, an individual switching core having a square hysteresis characteristic and provided with two signal windings will require a readout winding to switch each element of one register into a corresponding element of another register.

In accordance with this invention, all of the bits of information stored in binary form in one register may be simultaneously gated into a second register by means of a transformer utilizing a ferromagnetic core such as ferrite having a narrow hysteresis loop characteristic. The first register may consist of a plurality of flip-flops, the two output potentials of which are directly connected by leads to the two triggering inputs of corresponding flip-flops of the second register. The connecting leads form the secondary windings of the transformer, the primary winding of which is connected to a gating pulse source. The gating pulses are of such amplitude and polarity that a potential is induced in each secondary winding which is less than the triggering potential of the flip-flop in the second register and is of such value that, when algebraically added to one of the potentials from the first register, is sufficient to provide a voltage signal level necessary to trigger an individual multivibrator of the second register. By this arrangement the gating pulses are operatively, but not physical, connected to the transfer leads (or rails).

It is therefore an object of the invention to provide a gating circuit in the form of a transformer having a core of ferromagnetic material not requiring a square hysteresis loop.

Another object of the invention is to provide a gating circuit in the form of a transformer for transferring information in binary digital form from one register to another.

A further object of the invention is to simultaneously gate a plurality of information bits in binary digital form from one storage register into a second register without destructive readout of the information in the first register.

The invention itself, together with further objects and advantages thereof may best be understood with reference to the following description taken in connection with the appended claims and in conjunction with the attached drawing in which:

FIGURE 1*a* shows the square hysteresis loop of the magnetics cores utilized in the prior art for transferring digital information between registers;

FIGURE 1*b* illustrates the narrow hysteresis loop characteristic of the transformer of the present invention;

Figures 1, 2:
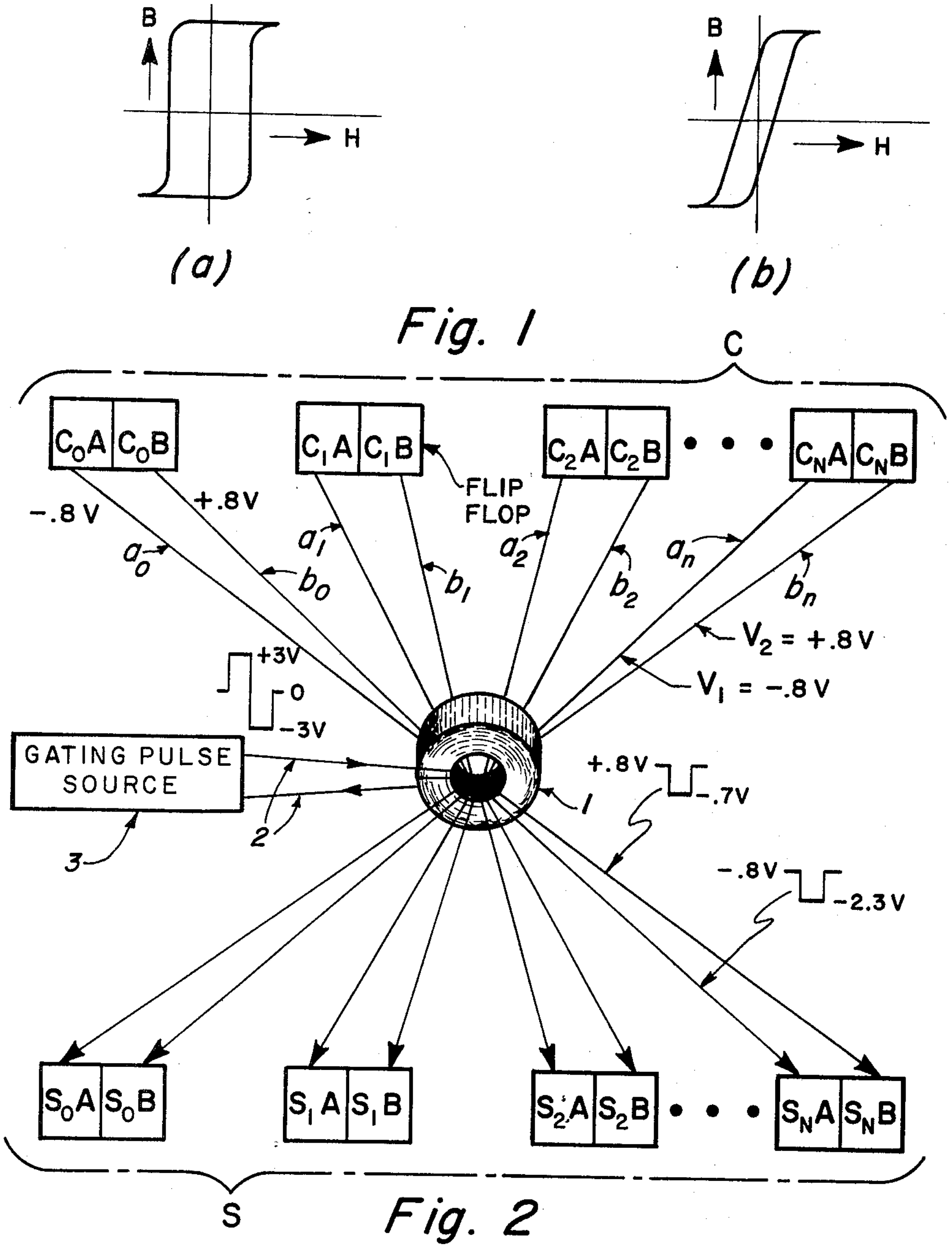
FIGURE 2 is a circuit diagram showing the main features of the invention.

The core 1 of the switching transformer of this invention is shown as being small (of the order of one inch outside diameter) and of toroidal form in FIGURE 2, although a core of any other form may be provided. Preferably, the core is of ferrite and has the hysteresis characteristic shown in FIGURE 1*b*. The core is provided with a primary winding 2 which is coupled to a gating pulse source 3 (as for example a blocking oscillator), and which may generate a train of spaced pulses of one polarity or another or a continuous train of "spaced" pulses of alternate polarity as shown in FIGURE 2 of the drawing.

The register C to be gated comprises a plurality of bistable multivibrators $C_0A$, $C_0B$ . . . $C_nA$, $C_nB$, known as flip-flops. Each of the flip-flops comprises a pair of transistor or vacuum tube elements A and B coupled together in a circuit such that when one is in a state of conduction the other is in a state of non-conduction, one such circuit being shown in FIGURE 3. When either one of the elements A or B is conducting, the potential at its output terminal is different from that when it is in a non-conducting state. Either one of the potentials at either output terminal may represent the binary information bit 0 or 1 and such representation is consistently used for each of the flip-flops $C_0A$, $C_0B$ . . . $C_nA$, $C_nB$ of the register. As shown in the drawing, the element A of the flip-flop "$C_nA$, $C_nB$," is in a certain one of its states such that the potential at its output terminal is, for example, —.8 volt while the potential at the B element is +.8 volt.

The register S into which the information is to be transferred is, like register C, comprised of a plurality of flip-flops designated as $S_0A$, $S_0B$ . . . $S_nA$, $S_nB$. The input or switching terminals of each of the flip-flops of register S are directly coupled, respectively, to the output terminals of each of the flip-flops of the register C through diodes 5 (see FIGURE 3) having a threshold voltage of greater than —1.5 volts (for example —1.6 volts). As is well known, with one of the elements of a flip-flop in a state of conduction, a pulse of the proper polarity and potential applied to an input control terminal thereof is sufficient to switch that element into a state of non-conduction and to switch the other element of the flip-flop into a state of conduction. The input switching pulse may also be applied to the input switching terminal of the non-conducting element of proper potential and of opposite polarity to trigger it into a conducting state, which in turn switches off the element that is conducting.

The connection between the input terminal of each element of the flip-flops of the register S and the respective output terminal of each of the flip-flops of register C, is by a lead $a_o, b_o$ . . . $a_n$, $b_n$ which extends through the opening in the toroidal core 1 and forms a single turn secondary winding about the core. A gating pulse source 3 is coupled to the terminals of the primary winding 2 and emits gating pulses of the proper polarity and amplitude to perform the switching function, as will be later explained or, as shown by the drawing, may be pulses of alternating polarity of the proper amplitude.

As an example only, assuming that for a stored 0 in $C_nA$, a stored 1 in $C_nB$ in register C, then the potential at the output of element A will be −0.8 volt and that at element B +0.8 volt. For a stored 1, the potential at the output of the element A would be +0.8 volt and that for element B −0.8 volt. In order for the flip-flop $S_nA$, $S_nB$ of register S to store a 0, an input signal must be applied to the switching input terminals of its elements A and B of values $-0.8+V_s$ volts and $+0.8+V_s$ volts, respectively, where $V_s$ represents the value of the gating pulse from source 3 induced in the secondary winding and is less than the triggering potential required at the input for the flip-flop $S_nA$, $S_nB$. In order to cause the flip-flop $S_nA$, $S_nB$ of the register S to store a 1, the signal input terminals of its element A and B must be supplied with signals having a value $+0.8+V_s$ volts and $-0.8+V_s$ volts, respectively. Since the input terminals of elements A and B of the flip-flops of register S are all directly connected to the output of the corresponding element A and B of the flip-flops of register C, it requires only that the signal $V_s$ be provided in order to transfer the stored binary information from the register C to the register S. If the pulse source 3 provides pulses varying in amplitude between +3 and −3 volts to the primary winding 2 (having two turns), a voltage $V_s$ of ±1.5 volts is induced in the leads $a_{o-n}$ and $b_{o-n}$ (forming the secondary winding having one turn) which is algebraically added to the voltages appearing on the leads *a* and *b* in order to effect a setting of the flip-flop $S_nA$, $S_nB$ of the register S. All of the stored information in the flip-flops of the register C will be simultaneously transferred to the respective flip-flops of the register S. The positive excursions of the switching pulses from the source 3 will have no effect on the register S since the flip-flops of the latter are so designed as to require a voltage at the inputs of the element A or B more negative than −1.5 volts in order to set them.

Although spaced pulses of a single polarity may be used as the gating signals, the use of pulses of alternating polarity from a blocking oscillator permits a controlled delay where desired. Depending on the specific requirement of the register into which the information is to be transferred, either the positive or negative excursions of the gating pulse may be effective in setting the flip-flops of the register S. The flip-flops of the register C need not be symmetrical, that is, the output potentials of the elements A and B need not be equally negative and positive. Furthermore, the values of the input switching voltages for the elements A and B of the register S need not be the same and depend only on the specific design limitations of the particular circuits involved.

The gating circuit above described employs no active components and is exceptionally fast and relatively inexpensive. The ferromagnetic material of the core can have a very narrow hysteresis loop and does not depend for its operation on a material having a square hysteresis characteristic as required by the switching devices of the prior art structures.

In one practical form of the invention, a single gating core having an eight-turn primary has been used successfully to control forty-four single wire secondaries because of its low loss and small power requirements.

While reference has been made in this specification to a primary having two turns and a secondary having one turn, actually it is only necessary to maintain a turns ratio of 2:1 (or any other desired ratio) and in practice the arrangement shown in FIGURE 2 is often described as a primary having a once-around turn and a secondary passing through the center of the gating device. Thus the several secondary leads may be bunched and passed through the small toroid core without the necessity of performing any winding on the leads, except the bending required to establish their direction to and from the toroid core. This novel concept greatly facilitates initial installation and maintenance of a computer utilizing this invention.

Figure 3:
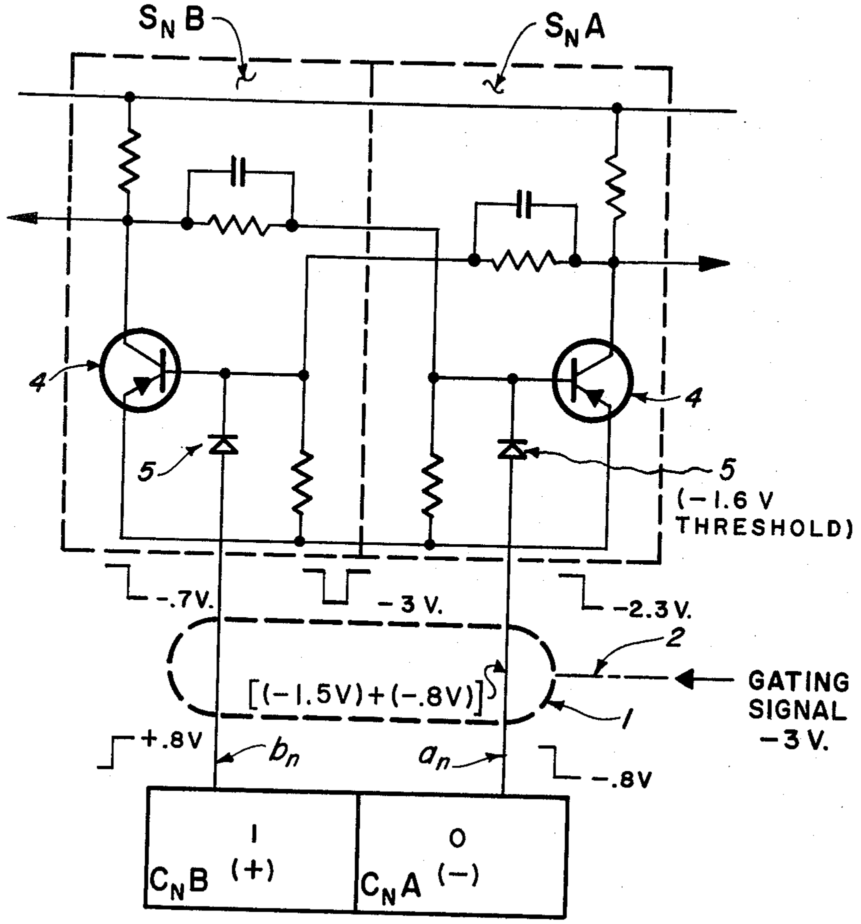
FIGURE 3 is a detail circuit drawing of a flip-flop arrangement suitable for utilization in the circuit of FIGURE 2 when the latter is employed in double rail fashion.

FIGURE 3 discloses a typical flip-flop circuit such as indicated at $S_nA$ and $S_nB$ when the device of FIGURE 2 is utilized as a double rail transfer gating system. The output of the register $C_nA$–$C_nB$ will be a binary "0" when the output of side $C_nA$ is negative (conducting) and the output of side $C_nB$ is positive (nonconducting). Under these conditions, the lead (or rail) $a_n$, having a potential of −.8 volt, passes through the toroidal core 1, and the lead $b_n$, having a potential of +.8 volt also passes through core 1. When the two-turn primary winding 2 of the core 1 receives a gating signal equal to a potential of −3 volts, each winding (lead *a* and *b*) of the single-turn secondary winding receives a signal due to the 2:1 step-down ratio of the windings of −1.5 volts. This signal (−1.5 volts) when added to the voltage levels in the leads (referred to generally as *a* and *b*) will produce a voltage of −2.3 volts in lead *a* and a voltage of −.7 volt in lead *b*. Leads *a* and *b* each connect to the base lead of a PNP transistor 4 through diodes 5 which have a threshold voltage in excess of −1.5 volts (for example −1.6 volts). Thus it will be seen from FIGURE 3 that the signal from side $C_nA$ of the first flip-flop register will reach the base lead of the transistor of side $S_nA$ of the second flip-flop register (enlarged in FIGURE 3 for clarity of illustration) into which the information of the first register is to be transferred or gated. Since the signal from $C_nA$ is a negative signal (−2.3 volts) and is in excess of the threshold voltage (−1.6 volts) of diode 5, it will reach the base lead of transistor 4 of side $S_nA$. Since a negative signal applied to the base of a PNP transistor will cause the transistor to conduct, side $S_nA$ will conduct and the $S_n$ register will correspond to the $C_n$ register. If side $S_nA$ were already conducting, it would merely continue to conduct; if it were not conducting, the gating operation described would turn on its transistor 4 and cause side $S_nA$ to start conducting. In a bistable flip-flop such as $S_n$ and $C_n$, when one side ($S_nA$ or $C_nA$) starts conducting, the other side $S_nB$ or $C_nB$ is automatically cut off. The gating pulse which was added to lead *b* by the described operation will have no effect on the overall operation because its value (−1.5 volts) plus the potential already in lead *b* (+.8 volt) will result in a potential (−.7 volt) which is not sufficient to exceed the threshold (or alternately the back bias) voltage (−1.6 volts) of diode 5 of the $S_nB$ side. Therefore no negative signal will reach transistor 4 of the $S_nB$ side, and this side will remain non-conducting.

If NPN transistors are used in the above circuit of FIGURE 3, then the polarities of the signals and the threshold voltage of diodes 5 must be changed to be compatible with the requirements of these transistors in a manner well known in the art.

Any portion of the circuit of FIGURE 3 not described in detail may be considered to be of conventional configuration. The flip-flop portion of the circuit of FIGURE 3, for example, corresponds in operation to the operation of a conventional bistable multivibrator of the type shown and described on pages 202–204 of the publication entitled "Basic Theory and Application of Transistors," published by the Department of the Army, March 1959 and identified as Technical Manual TM–11–690. This publication is incorporated in this patent specification by reference.

Although this invention is here illustrated and described with respect to certain values and polarities of voltages and a particular shape of core, it should be understood that the invention may be practiced otherwise than as specifically described within the scope of the appended claims.

What is claimed is:

1. In a computer having means for storing electrical potentials of one of two values representative of an information bit, means for effecting a transfer of the information comprising, a switching circuit operative in response to a triggering potential at its input which is different from the value of the stored potential, a gating circuit comprising, a transformer having an input signal primary winding and a secondary winding with its terminals respectively connected to the storing means and the input of the switching circuit, whereby an input signal of a predetermined potential applied to the terminals of the primary winding will induce a signal in the secondary winding which is less than the triggering potential such that the algebraic sum of the induced signal and one of said stored electrical potential triggers the switching circuit and the algebraic sum of the induced signal and the other of said stored electrical potential does not trigger the switching circuit.

2. In a computer having means for substantially simultaneously storing electrical potentials of a first and second value representative of a binary information bit, means for effecting a transfer of the information comprising a switching circuit having a pair of inputs, said switching circuit being conditioned into one of two states of operation in response to triggering potentials at either of its inputs of a predetermined value different from the stored potentials, a gating circuit comprising, a transformer having an input signal primary winding and a pair of secondary windings, one terminal of each secondary winding being connected to a respective input of the switching circuit and the other terminal of each secondary being connected respectively to a first and second potential, whereby an input signal of a predetermined potential applied to the terminals of the primary winding induces a signal which is less than the triggering potential in each of the secondary windings such that when the algebraic sum of the induced signal and the respective stored potential in the secondary windings reaches the predetermined value, the switching circuit will be conditioned into one of the two states of operation.

3. In a computer having means for storing information in binary form comprising a plurality of means for individually storing electrical potentials of one of two values representative of an information bit, means for effecting a transfer of the information comprising, a plurality of switching circuits each operative in response to a triggering potential at its input which is different from the said electrical potentials, a gating circuit comprising a transformer having an input signal primary winding and a plurality of secondary windings, each of the secondary windings having its terminals respectively connected to one storing means and the input of one switching circuit, whereby an input signal of a predetermined potential applied to the terminals of the primary winding will induce a signal in each of the secondary windings which is less than the triggering potential such that the algebraic sum of the induced signal and one of said stored potentials trigger the switching circuit and the algebraic sum of the induced signal and the other of said stored potentials does not trigger the switching circuit.

4. In a computer having means for storing information in binary form comprising, a plurality of individual storage devices each storing electrical potentials of a first and second value representative of a binary information bit, means for effecting a transfer of the information comprising, a plurality of switching circuits each having a pair of inputs and conditioned into one of two states of operation in response to triggering potentials at either of its inputs of a predetermined value different from the stored potentials, a gating circuit comprising, a transformer having an input signal primary winding and a plurality of pairs of secondary windings, one terminal of each pair of secondary windings being connected to its respective input terminal of the pair of inputs of one switching circuit and the other terminal of each pair of secondary windings connected to its respective stored potential of a pair of stored potentials in an individual storage device, whereby an input signal of a predetermined potential applied to the terminals of the primary winding induces a signal in each of the secondary windings which is less than the triggering potential such that when the algebraic sum of the induced signal and the respective stored potential in each of the secondary windings reaches the predetermined value, the switching circuits will be substantially simultaneously conditioned into one of the two states of operation.

5. A gating circuit as in claim 1 wherein said secondary winding includes a diode having a threshold voltage in excess of the induced signal in the secondary winding.

6. In combination, a first binary register comprising a plurality of storage devices operated to store binary information, a second binary register also comprising a plurality of storage devices and operated to store binary information in response to a trigger potential at their inputs, and a plurality of leads connected between corresponding storage devices of said first and second binary register, a transformer, all of said leads passing through said transformer and comprising secondary windings therefor, a primary winding on said transformer, and a gating pulse source connected to said transformer windings in such a manner that when a pulse of a predetermined polarity passes through said primary winding from said gating pulse source a signal is induced in each secondary winding of an amplitude and polarity which is less than said triggering potential to transfer all of the binary information from said first register to said second register.

7. A digital transfer system having in combination (a) means for storing either of two electrical potentials A or B representative of an information bit;

(b) means for effecting a transfer of said information bit comprising a switching circuit responsive to potential C exceeding a designated magnitude of a given polarity;

(c) a gating circuit comprising, (1) a transformer having an input signal primary winding and (2) a secondary winding with its terminals respectively connected to said storing means and to the input of the switching circuit and having induced therein a potential D of predetermined magnitude which is less than said designated magnitude of a given polarity upon the application of an input signal to said primary winding;

(d) said potentials A, B, C and D being so related to one another that said switching circuit is nonresponsive to said potentials A and B alone, but upon the application of said input signal of predetermined magnitude to the terminals of the primary winding of said transformer said potential D is induced in said secondary winding such that when said potential D is algebraically added to one of said two electrical potentials A or B and is of the same polarity and greater magnitude than potential C a transfer of said information bit is effected, and when said potential D is algebraically added to the other of said two potentials A or B and is of less magnitude and of the same polarity as potential C or of any magnitude when of the opposite polarity from potential C, a transfer of said information bit is not effected.

8. A digital transfer system having in combination (a) means for storing either of two electrical potentials A or B representative of an information bit;

(b) means for effecting a transfer of said information bit comprising a switching circuit responsive to potential C exceeding a designated magnitude of a given polarity;

(c) a gating circuit comprising, (1) a transformer having an input signal primary winding and (2) a secondary winding with its terminals respectively connected to said storing means and to the input of the switching circuit, said secondary winding having induced therein responsive to the application of an input signal of a predetermined magnitude to said primary winding a voltage D of equal and opposite polarity to said one of two electrical potentials A or B, D being less than designated magnitude of a given polarity;

(d) said potentials A, B, C and D being so related to one another that said switching circuit is nonresponsive to said potentials A and B alone but is responsive to effect a transfer of said information bit when the algebraic sum of potential D and one of said two electrical potentials A or B is of the same polarity and greater magnitude than potential C and non-responsive to effect a transfer of said information bit when the algebraic sum of potential D and the other of said two potentials is zero.

9. In a digital transfer system comprising (a) means for substantially simultaneously storing either of two electrical potentials A and B representative of a binary information bit;

(b) means for effecting a transfer of the information comprising a switching circuit having a pair of inputs, said switching circuit being responsive to potential C exceeding a designated magnitude of a given polarity;

(c) a gating circuit comprising (1) a transformer having an input signal primary winding and a pair of secondary windings having induced therein a potential D of predetermined magnitude which is less than said designated magnitude of a given polarity upon the application of an input signal to said primary winding, (2) one terminal of each secondary winding being connected to a respective input of the switching circuit and the other terminal of each secondary winding being connected respectively to said first mentioned means for storing either of said two electrical potentials A and B;

(d) said potentials A, B, C and D being so related to one another that said switching circuit is nonresponsive to said potentials A and B alone, but upon the application of said input signal of predetermined magnitude to the terminals of the primary winding of said transformer said potential D is induced in said secondary winding such that when said potential D is algebraically added to one of said two electrical potentials A and B and is of the same polarity and greater magnitude than potential C a transfer of said information bit is effected, and when the algebraic sum of potential D and the other of said two electrical potentials A and B is of less magnitude and the same polarity as potential C or of any magnitude when of the opposite polarity from potential C, a transfer of said information bit is not effected.

10. A digital transfer system comprising (a) means for substantially simultaneously storing either of two electrical potentials A and B representative of a binary information bit;

(b) means for effecting a transfer of the information comprising a switching circuit having a pair of inputs, said switching circuit being responsive to potential C exceeding a designated magnitude of a given polarity;

(c) a gating circuit comprising, (1) a transformer having an input signal primary winding and a pair of secondary windings, (2) one terminal of each secondary winding being connected to a respective input of the switching circuit and the other terminal of each secondary winding being connected respectively to said first-mentioned means for storing either of two of said electrical potentials A and B and having induced therein, responsive to the application of an input signal of a predetermined magnitude to said primary winding, a voltage D in said pair of secondary windings of equal and opposite polarity to said one of two electrical potentials A and B;

(d) said potentials A, B, C and D being so related to one another that said switching circuit is non-responsive to said potentials A and B alone but is responsive to effect a transfer of said information bit when the algebraic sum of potential D and one of said two electrical potentials A and B is of the same polarity and greater magnitude than potential C and non-responsive to effect a transfer of said information bit when the algebraic sum of potential D and the other of said two potentials is zero.

11. A digital transfer system comprising (a) means for storing information in binary form comprising a plurality of individual storage devices each storing electrical potentials A and B representative of a binary information bit;

(b) means for effecting a transfer of the information comprising a plurality of switching circuits each having a pair of inputs, said inputs being responsive to potential C at either of its inputs with said potential C exceeding a designated magnitude of a given polarity;

(c) a gating circuit comprising (1) a transformer having an input signal primary winding and plurality of pairs of secondary windings, each of said pairs of secondary windings having induced therein a potential D which is less than said designated magnitude of a given polarity upon the application of an input signal to said primary winding, (2) one terminal of each pair of secondary windings being connected to its respective input terminal of the pair of inputs of one switching circuit and the other terminal of each pair of secondary windings connected to its respective stored potential of a pair of stored potentials of an individual storage device;

(d) said potentials A, B, C and D being so related to one another that said switching circuit is non-responsive to said potentials A and B alone, but upon the application of said input signal of predetermined magnitude to the terminals of the primary winding of said transformer, said potential D is induced in each pair of said secondary windings such that when said potential D is algebraically added to one of two of said electrical potentials A and B and is of the same polarity and greater magnitude than potential C a transfer of said information bit is effected and when said potential D is algebraically added to the other of said two electrical potentials A and B and is of less magnitude when of the same polarity as potential C or of any magnitude when of the opposite polarity from potential C, a transfer is not effected.

References Cited by the Examiner

UNITED STATES PATENTS

| | | | |
|---|---|---|---|
| 2,733,860 | 2/1956 | Rajchman | 340—166 X |
| 2,909,680 | 10/1959 | Moore | 307—88.5 X |
| 2,912,511 | 11/1959 | McKim | 307—88.5 |
| 2,974,866 | 3/1961 | Haddad | 235—157 |
| 2,997,694 | 8/1961 | Thompson | 307—88.5 X |
| 3,035,182 | 5/1962 | Thornton | 307—88.5 |

OTHER REFERENCES

Page 101, Digital Computer Primer by McCormick, McGraw-Hill Book Co., Inc., No. QA76.5 M2 C.2, figure 712.

ROBERT C. BAILEY, *Primary Examiner.*

MALCOLM A. MORRISON, *Examiner.*